(12) United States Patent
Rawas (10) Patent No.: US 12,492,077 B2
(45) Date of Patent: Dec. 9, 2025

(54) SYSTEM AND METHOD FOR VARIABLE SIZE CONTAINER HANDLING

(71) Applicant: AGILENT TECHNOLOGIES, INC., Santa Clara, CA (US)

(72) Inventor: Oussama Rawas, Santa Clara, CA (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 213 days.

(21) Appl. No.: 18/353,721

(22) Filed: Jul. 17, 2023

(65) Prior Publication Data

US 2025/0026572 A1   Jan. 23, 2025

(51) Int. Cl.
  *B65G 15/14*   (2006.01)

(52) U.S. Cl.
  CPC .................................. *B65G 15/14* (2013.01)

(58) Field of Classification Search
  None
  See application file for complete search history.

(56) References Cited

U.S. PATENT DOCUMENTS

| | | | | |
|---|---|---|---|---|
| 2,825,442 A * | 3/1958 | Carter | ................ | B65G 47/2445 156/DIG. 27 |
| 3,722,657 A * | 3/1973 | Kienle | ................ | B65G 47/2445 198/399 |
| 3,901,381 A * | 8/1975 | Quinn | ................ | B65G 47/2445 198/379 |
| 4,464,884 A * | 8/1984 | Franks | ................ | B65G 15/14 53/137.1 |
| 5,145,047 A * | 9/1992 | Terracol | ................ | B23Q 7/003 198/341.02 |
| 6,443,448 B1 * | 9/2002 | Mohr | ................ | B65G 47/31 198/460.1 |
| 2023/0107041 A1 | 4/2023 | Flammann et al. | | |

FOREIGN PATENT DOCUMENTS

| | | | |
|---|---|---|---|
| CN | 216334638 U | * | 4/2022 |
| JP | 07144730 A | | 6/1995 |
| JP | 2000264426 A | | 9/2000 |
| JP | 3119387 U | | 2/2006 |
| JP | 2012136279 A | | 7/2012 |

OTHER PUBLICATIONS

International Search Report and Written Opinion—International Application No. PCT/US2024/027052—KIPO—mailed Aug. 26, 2024.

* cited by examiner

*Primary Examiner* — Kavel Singh (57) ABSTRACT

In some examples, a system may include at least two conveyors disposed at a specified distance apart and movable toward each other to reduce the specified distance or away from each other to increase the specified distance. The at least two conveyors may be operable to move a container that is contiguously disposable between the at least two conveyors along a first direction when the at least two conveyors are operated in the first direction and along a second direction that is opposite to the first direction when the at least two conveyors are operated in the second direction.

18 Claims, 8 Drawing Sheets

SYSTEM AND METHOD FOR VARIABLE SIZE CONTAINER HANDLING

BACKGROUND

Systems for handling containers typically include a belt onto which a container is placed for transport from one location to another. In some cases, when a label is to be applied to a cylindrical container, a rotary label applicator may be utilized to apply the label to the cylindrical surface of the container.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

As disclosed herein, systems for handling containers typically include a belt onto which a container is placed for transport from one location to another. Such systems are limited in their capacity to handle containers of different sizes and shapes. In this regard, it is technically challenging to automatically handle containers of different sizes and shapes. Further, when a label is to be applied to a cylindrical container, a rotary label applicator may be utilized to apply the label to the cylindrical surface of the container. Such applicators may add additional complexity and expense to a container handling system. In this regard, it is technically challenging to apply labels onto a container without utilizing a rotary label applicator.

The systems and methods disclosed herein address at least the aforementioned technical challenges by implementing a positive-controlled container handling system for accepting, advancing, staging, securing, rotating, and discharging containers of variable sizes and shapes. The systems and methods disclosed herein provide advances such as positive-controlled handling of containers, such as round containers, as well as containers of other types of shapes and sizes. The systems and methods disclosed herein provide automatic adjustment for various size round (as well as other shaped) containers, as well as in-line flow for containers. Yet further, the systems and methods disclosed herein provide unlimited re-configurability for different sized and shaped containers, as well as elimination of the need to change parts to account for different sized and shaped containers.

According to examples disclosed herein, a system may include at least two conveyors disposed at a specified distance apart and movable toward each other to reduce the specified distance or away from each other to increase the specified distance. The at least two conveyors may be operable to move a container that is contiguously disposable between the at least two conveyors along a first direction when the at least two conveyors are operated in the first direction and along a second direction that is opposite to the first direction when the at least two conveyors are operated in the second direction.

According to examples disclosed herein, for the system described above, the container may include a cylindrical container.

According to examples disclosed herein, the system described above may further include at least two further conveyors disposed at the specified distance apart and movable toward each other to reduce the specified distance or away from each other to increase the specified distance. The at least two further conveyors may be operable to further move the container that is contiguously disposable between the at least two further conveyors along the first direction when the at least two further conveyors are operated in the first direction and along the second direction when the at least two further conveyors are operated in the second direction.

According to examples disclosed herein, for the system described above, a further conveyor of the at least two further conveyors may be rotatable in a first rotary direction relative to an axis that is perpendicular to the at least two further conveyors.

According to examples disclosed herein, for the system described above, another further conveyor of the at least two further conveyors may be rotatable in a second rotary direction relative to another axis that is perpendicular to the at least two further conveyors to contiguously grasp and rotate the container. The second rotary direction may be opposite to the first rotary direction.

According to examples disclosed herein, for the system described above, the at least two further conveyors may be disengageable from the at least two conveyors upon rotation of the at least two further conveyors.

According to examples disclosed herein, for the system described above, a conveyor of the at least two conveyors may be rotatable in a first rotary direction relative to an axis that is perpendicular to the at least two conveyors.

According to examples disclosed herein, for the system described above, another conveyor of the at least two conveyors may be rotatable in a second rotary direction relative to another axis that is perpendicular to the at least two conveyors to contiguously grasp and rotate the container. The second rotary direction may be opposite to the first rotary direction.

According to examples disclosed herein, the system described above may further include first and second sets of at least two further conveyors disposed at the specified distance apart and movable toward each other to reduce the specified distance or away from each other to increase the specified distance. The first and second sets of the at least two further conveyors may be rotatable in first and second rotary directions relative to axes that are perpendicular to the first and second sets of the at least two further conveyors to contiguously grasp and rotate the container.

According to examples disclosed herein, for the system described above, the first and second sets of the at least two further conveyors may contiguously grasp the container at greater than two distinct positions.

According to examples disclosed herein, a system may include at least two conveyors disposed at a specified distance apart and rotatable in first and second rotary directions relative to axes that are perpendicular to the at least two conveyors to contiguously grasp and rotate a container that is contiguously disposable between the at least two conveyors.

According to examples disclosed herein, a method may include positioning, based on a size of a container, at least two conveyors at a specified distance apart. The at least two conveyors may be movable toward each other to reduce the specified distance or away from each other to increase the specified distance.

According to examples disclosed herein, for the method described above, the method may further include operating the at least two conveyors to move the container that is contiguously disposable between the at least two conveyors along a first direction when the at least two conveyors are operated in the first direction and along a second direction that is opposite to the first direction when the at least two conveyors are operated in the second direction.

According to examples disclosed herein, for the method described above, the method may further include positioning, based on the size of the container, at least two further conveyors at the specified distance apart. The at least two further conveyors may be movable toward each other to reduce the specified distance or away from each other to increase the specified distance. The method may further include operating the at least two further conveyors to further move the container that is contiguously disposable between the at least two further conveyors along the first direction when the at least two further conveyors are operated in the first direction and along the second direction when the at least two further conveyors are operated in the second direction.

According to examples disclosed herein, for the method described above, the method may further include positioning, based on a size of another container, at least two further conveyors at another specified distance apart. The at least two further conveyors may be movable toward each other to reduce the another specified distance or away from each other to increase the another specified distance. The method may further include operating the at least two further conveyors to further move the another container that is contiguously disposable between the at least two further conveyors along the first direction when the at least two further conveyors are operated in the first direction and along the second direction when the at least two further conveyors are operated in the second direction.

According to examples disclosed herein, for the method described above, the method may further include rotating a further conveyor of the at least two further conveyors in a first rotary direction relative to an axis that is perpendicular to the at least two further conveyors.

According to examples disclosed herein, for the method described above, the method may further include rotating another further conveyor of the at least two further conveyors in a second rotary direction relative to another axis that is perpendicular to the at least two further conveyors to contiguously grasp and rotate the container. The second rotary direction may be opposite to the first rotary direction.

According to examples disclosed herein, for the method described above, the method may further include disengaging the at least two further conveyors from the at least two conveyors upon rotation of the at least two further conveyors.

Figure 1:
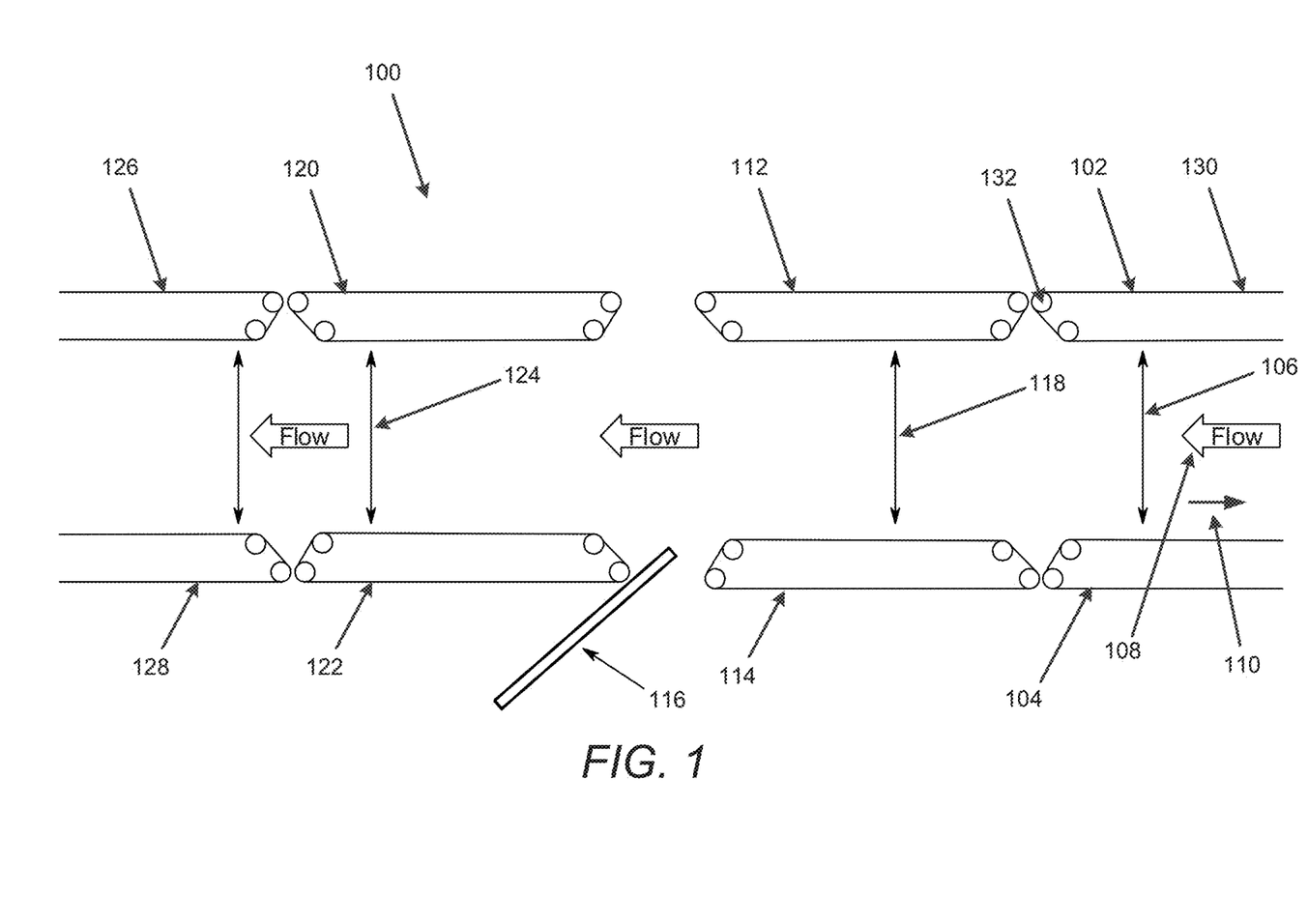
FIG. 1 illustrates a layout of a variable size container handling system, in accordance with an example of the present disclosure.
Figure 2:
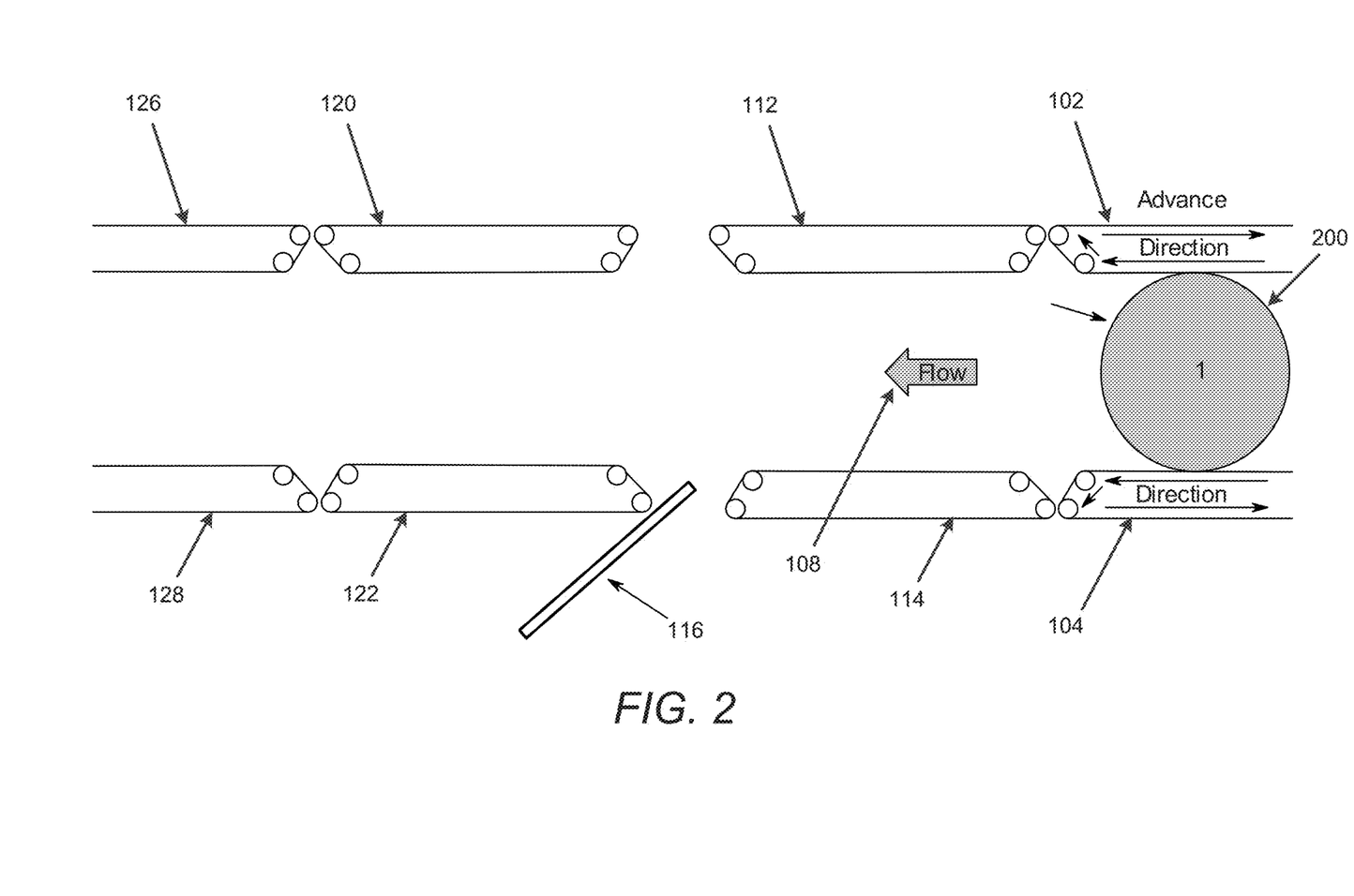
FIG. 2 illustrates an example of operation of the variable size container handling system of FIG. 1 with a single container of a first size (e.g., a specified size), in accordance with an example of the present disclosure.

FIG. 1 illustrates a layout of a variable size container handling system (hereinafter also referred to as "system 100"), in accordance with an example of the present disclosure. FIG. 2 illustrates an example of operation of the variable size container handling system of FIG. 1 with a single container of a first size (e.g., a specified size), in accordance with an example of the present disclosure.

Referring to FIG. 1, the system 100 may include at least two conveyors 102 and 104 disposed at a specified distance 106 apart and movable toward each other to reduce the specified distance 106 or away from each other to increase the specified distance 106. For example, although two conveyors 102 and 104 are shown in FIG. 1, additional sets of conveyors similar to the conveyors 102 and 104 may be provided adjacent to the conveyors 102 and 104 (e.g., on the right hand side of the conveyors 102 and 104 in the orientation of FIG. 1). The at least two conveyors 102 and 104 may be movable toward each other, for example, by a drive member (not shown) that moves the at least two conveyors 102 and 104, and/or by a spring loaded mechanism (not shown) that biases the at least two conveyors 102 and 104 towards each other. Further, the at least two conveyors 102 and 104 may be movable away from each by a drive member (not shown). As shown in FIG. 2, the at least two conveyors 102 and 104 may be operable to move a container 200 (e.g., "container-1") that is contiguously disposable between the at least two conveyors 102 and 104 along a first direction 108 (see also FIG. 1) when the at least two conveyors 102 and 104 are operated in the first direction 108 and along a second direction 110 that is opposite to the first direction 108 when the at least two conveyors 102 and 104 are operated in the second direction 110.

According to examples disclosed herein, the container 200 may include a cylindrical container, but containers of other shapes and sizes may also be utilized. For example, containers of oval, rectangular, or other shapes may be utilized. In the example of FIG. 1, the container 200 may include a cylindrical container of a first size specified as "container-1".

In one example, the conveyors may include a belt and gear driven structure. For example, conveyor 102 may include a belt 130 that is driven by gear 132 or another type of drive. The other conveyors as disclosed herein may be similarly driven. Alternatively, the conveyors as disclosed herein may be driven by other types of drive systems.

The system 100 may further include at least two further conveyors 112 and 114 disposed at a specified distance 118 (which may be the same or different compared to the specified distance 106 based on the size of another cylinder) apart and movable toward each other to reduce the specified distance 118 or away from each other to increase the specified distance 118. The at least two further conveyors 112 and 114 may be operable to further move the container 200 that is contiguously disposable between the at least two further conveyors 112 and 114 along the first direction 108 when the at least two further conveyors 112 and 114 are operated in the first direction 108 and along the second direction 110 when the at least two further conveyors 112 and 114 are operated in the second direction 110.

A label applicator 116 may be utilized to apply labels or other indicia onto the container 200 as described in further detail with reference to FIG. 4.

Figure 3:
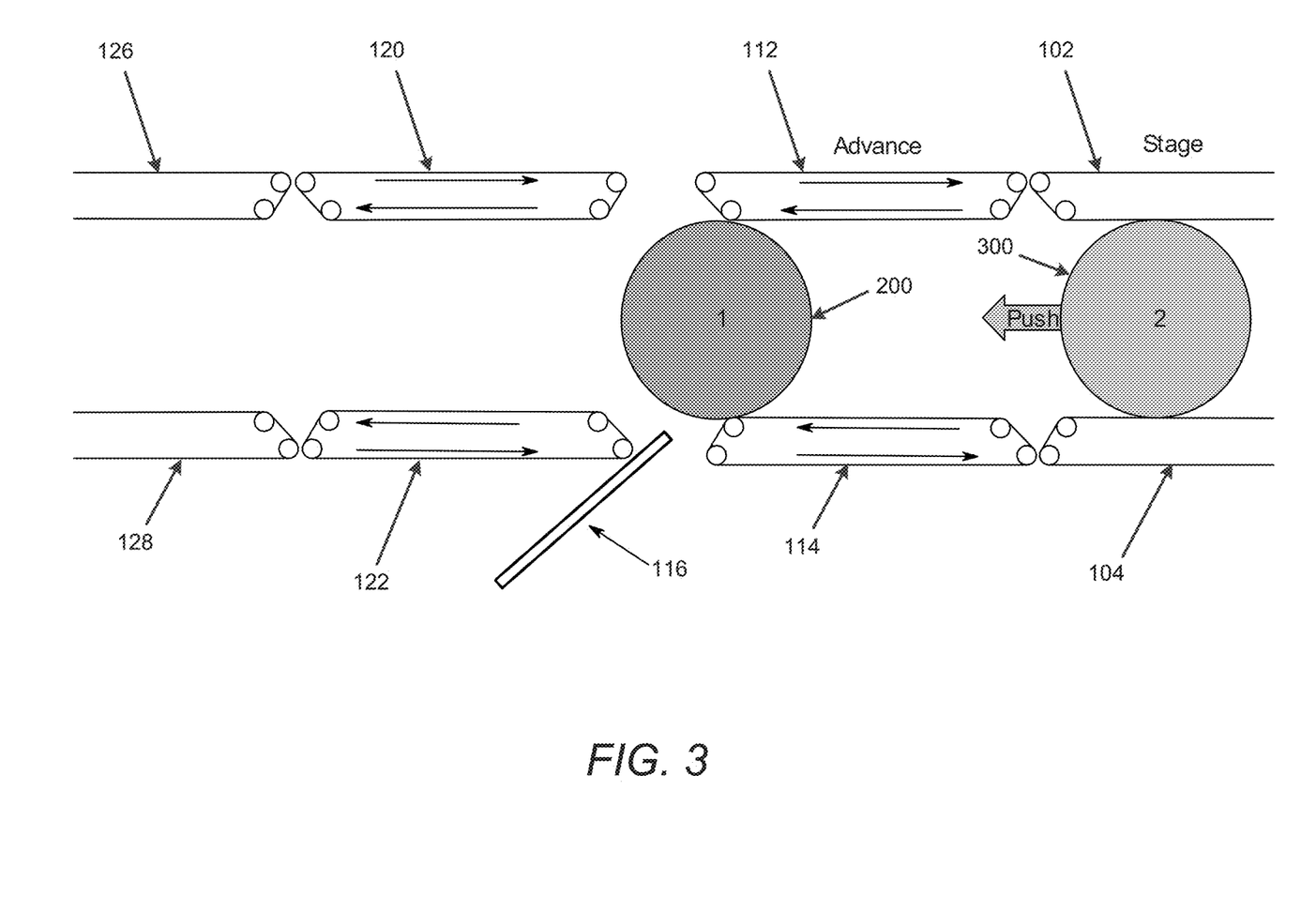
FIG. 3 illustrates another example of operation of the variable size container handling system of FIG. 1 with two containers of first and second sizes, in accordance with an example of the present disclosure.

FIG. 3 illustrates another example of operation of the variable size container handling system 100 with two containers of first and second sizes (e.g., specified as "container-1" and "container-2"), in accordance with an example of the present disclosure.

Referring to FIGS. 1 and 3, in the example shown, container 200 (also designated "container-1") may be of a greater size compared to container 300 (also designated "container-2"). With the at least two conveyors 102 and 104, and the at least two further conveyors 112 and 114 operating as disclosed herein with respect to FIGS. 1 and 2, the "container-1" may be advanced towards the label applicator 116, and the "container-2" may be staged between the at least two conveyors 102 and 104.

Figure 4:
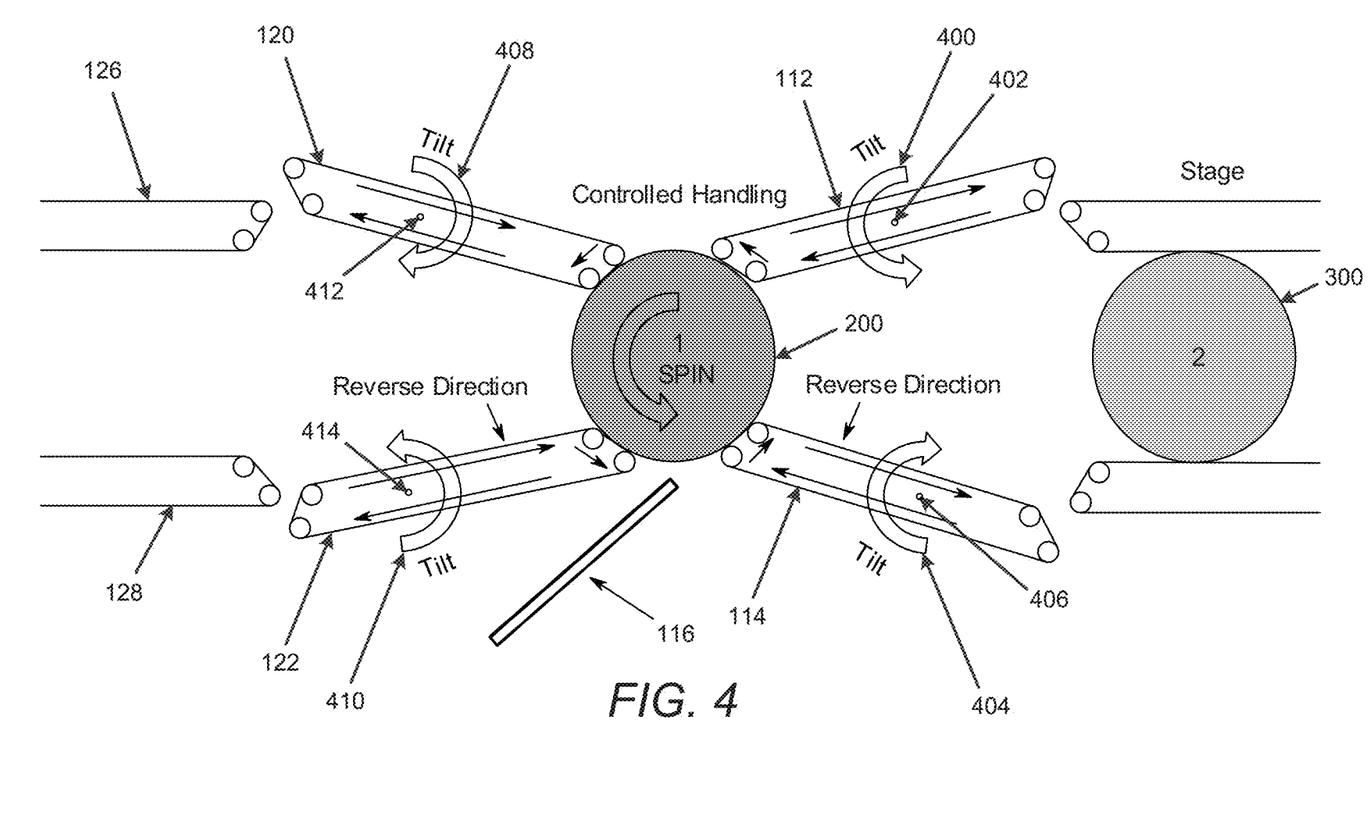
FIG. 4 illustrates another example of operation of the variable size container handling system of FIG. 1, with one of the containers shown in FIG. 3 being grasped and rotated, in accordance with an example of the present disclosure.

FIG. 4 illustrates another example of operation of the variable size container handling system 100, with one of the containers (e.g., "container-1" shown in FIG. 3 being grasped and rotated, in accordance with an example of the present disclosure.

Referring to FIG. 4, conveyor 112 of the at least two further conveyors 112 and 114 is rotatable in a first rotary direction 400 relative to an axis 402 (e.g., an axis shown as a dot) that is perpendicular to the at least two further conveyors 112 and 114.

Conveyor 114 of the at least two further conveyors 112 and 114 is rotatable in a second rotary direction 404 relative to another axis 406 (e.g., an axis shown as a dot) that is perpendicular to the at least two further conveyors 112 and 114 to contiguously grasp and rotate the container 200. As shown in FIG. 4, the second rotary direction 404 is opposite to the first rotary direction 400.

As shown in FIGS. 1 and 4, the system 100 may further include two further conveyors 120 and 122 disposed at a specified distance 124 (which may be the same or different compared to the specified distances 106 and 118 based on the size of another cylinder) apart and movable toward each other to reduce the specified distance 124 or away from each other to increase the specified distance 124. The two further conveyors 120 and 122 may be rotatable in first and second rotary directions 408 and 410 relative to axes 412 and 414, respectively, that are perpendicular to the two further conveyors 120 and 122 to contiguously grasp and rotate the container 200. Rotation of the container 200 may be performed by operation of the conveyors 114 and 122 in a reverse direction compared to the operation direction for advancement of the container 200 shown by the arrows in FIG. 3.

With continued reference to FIGS. 1 and 4, the conveyors 112 and 122, and 114 and 120 may be respectively designated as first and second sets of conveyors. In this regard, these sets of conveyors may rotate in the same rotary directions. The first and second sets of the conveyors may contiguously grasp the container 200 at greater than two distinct positions as shown. For example, the first and second sets of the conveyors may contiguously grasp the container 200 at four distinct positions as shown.

When the first and second sets of the conveyors 112 and 122, and 114 and 120 are rotated, the conveyors 112 and 114 may disengage from the conveyors 102 and 104. In this regard, the conveyors 112 and 122, and 114 and 120 may operate independently from the conveyors 102 and 104 to manipulate containers of different sizes.

According to examples disclosed herein, instead of or in addition to the conveyors 112 and 114 rotating as shown in FIG. 4, conveyors 102 and 104 may also be configured to rotate in a similar manner. In this regard, the conveyors 102 and 104 may be configured to rotate to contiguously grasp and rotate the container 200.

When the container 200 is grasped and rotated as shown in FIG. 4, the label applicator 116 may be re-positioned to contact the container 200 to apply one or more labels onto the container 200. In this regard, a label that is applied by the label applicator 116 may be applied to the cylindrical container 200 based on the rotation of the container 200.

Figure 5:
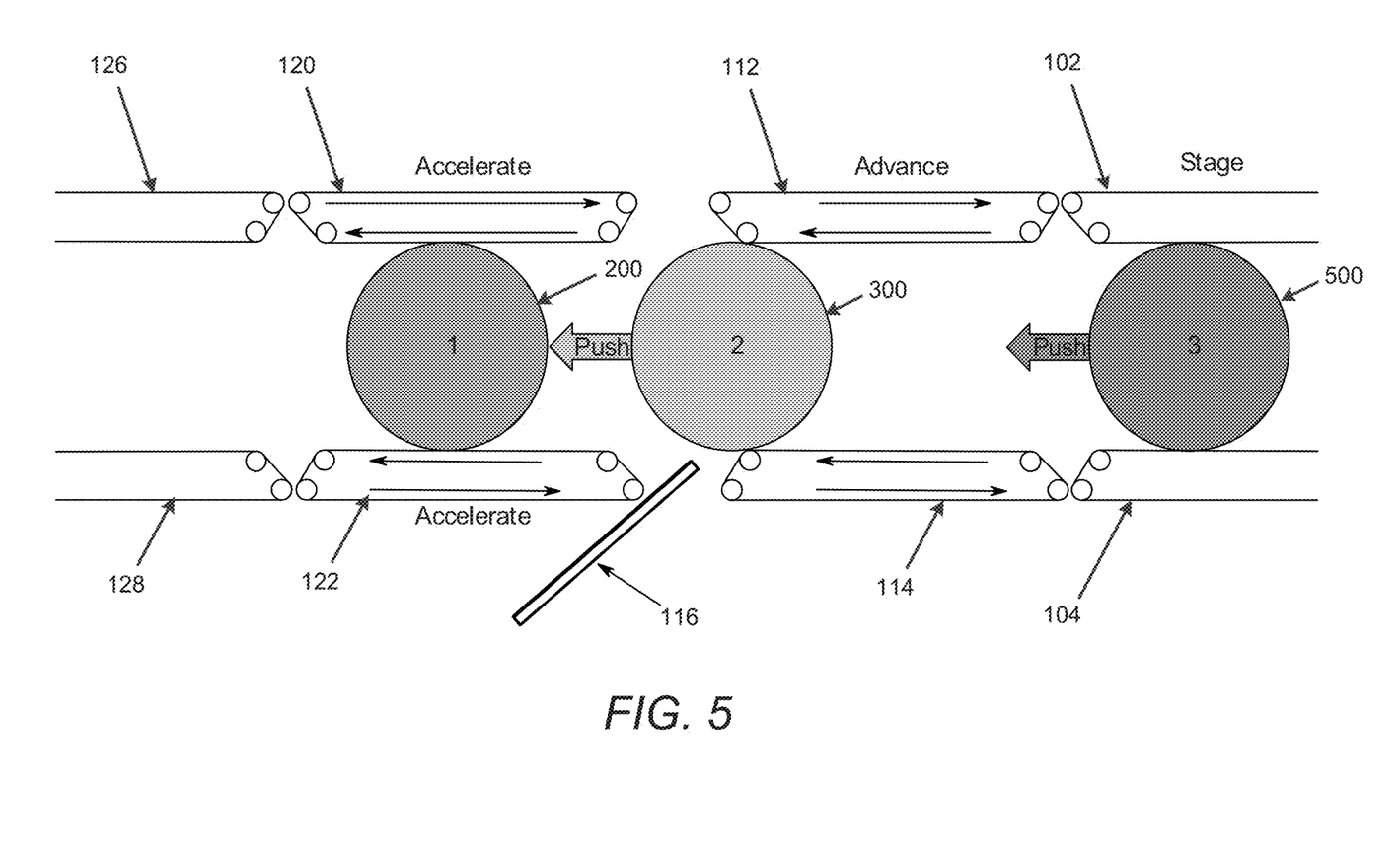
FIG. 5 illustrates another example of operation of the variable size container handling system of FIG. 1 with three containers of first, second, and third sizes, in accordance with an example of the present disclosure.

FIG. 5 illustrates another example of operation of the variable size container handling system 100 with three containers of first, second, and third sizes (also denoted "container-1", "container-2", and "container-3), in accordance with an example of the present disclosure.

Referring to FIGS. 1 and 5, the containers 200, 300, and 500 of first, second, and third sizes may be respectively staged, advanced, and accelerated by the conveyors 102 and 104, 112 and 114, and 120 and 122. Thus, with the conveyors 102 and 104, 112 and 114, and 120 and 122 operable independently as shown, the containers 200, 300, and 500, which may be the same or of different sizes, may be independently grasped and maneuvered.

Figure 6:
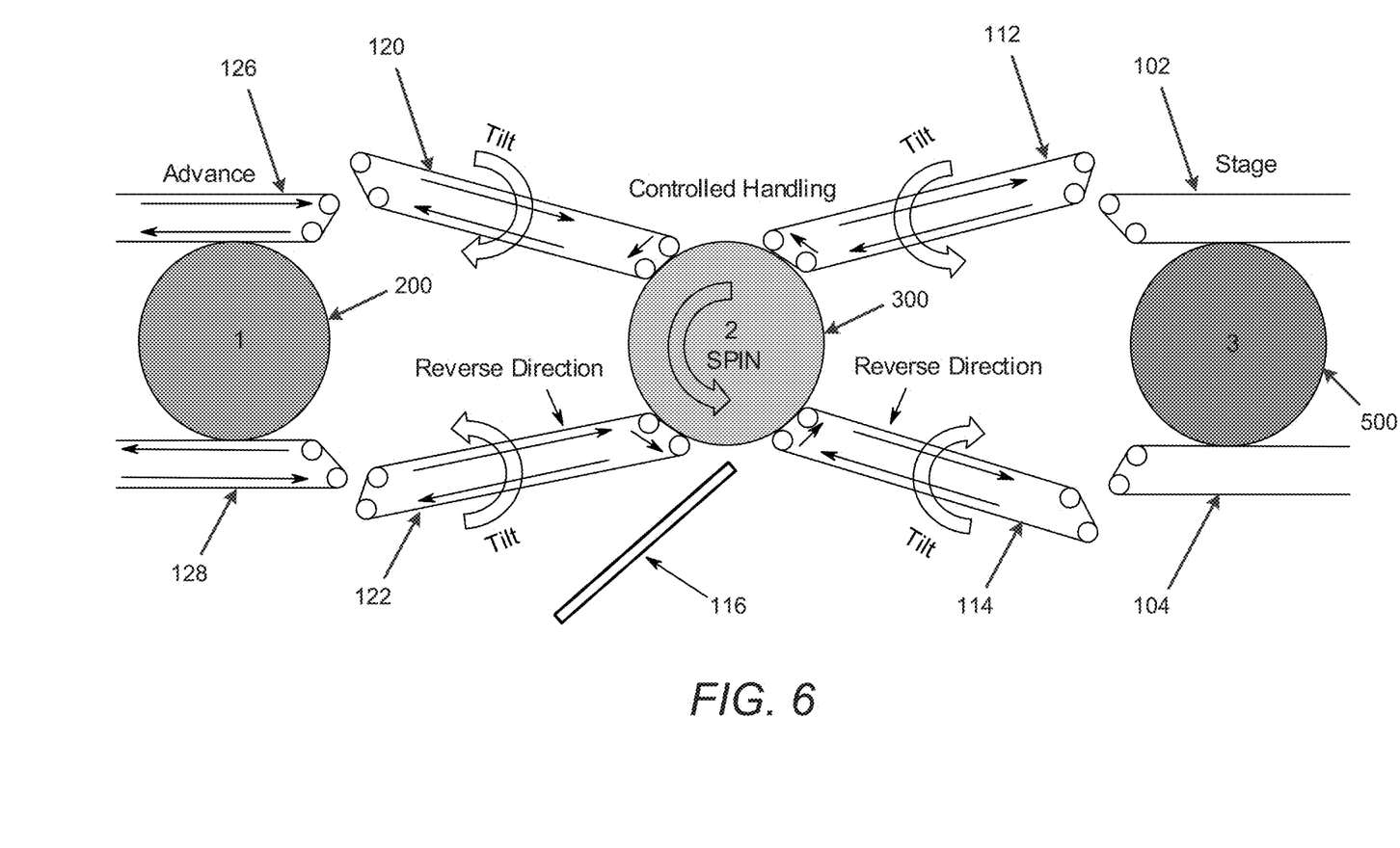
FIG. 6 illustrates another example of operation of the variable size container handling system of FIG. 1, with another one of the containers of FIG. 5 being grasped and rotated, in accordance with an example of the present disclosure.

FIG. 6 illustrates another example of operation of the variable size container handling system 100, with another one of the containers of FIG. 5 being grasped and rotated, in accordance with an example of the present disclosure.

Referring to FIGS. 1 and 6, as disclosed herein, with the conveyors 102 and 104, 112 and 114, and 120 and 122 operable independently as shown, the containers 200, 300, and 500, which may be of the same or of different sizes, may be independently grasped and/or maneuvered. For example, compared to FIG. 4 that shows container 200 being grasped and rotated, for FIG. 6, the container 300 is shown as being grasped and rotated by the conveyors 112 and 114, and 120 and 122. During performance of this operation on the container 300 by the conveyors 112 and 114, and 120 and 122, containers 200 and 500 may be independently advanced and staged, respectively. For example, the container 200 may be independently advanced by conveyors 126 and 128.

Figure 7:
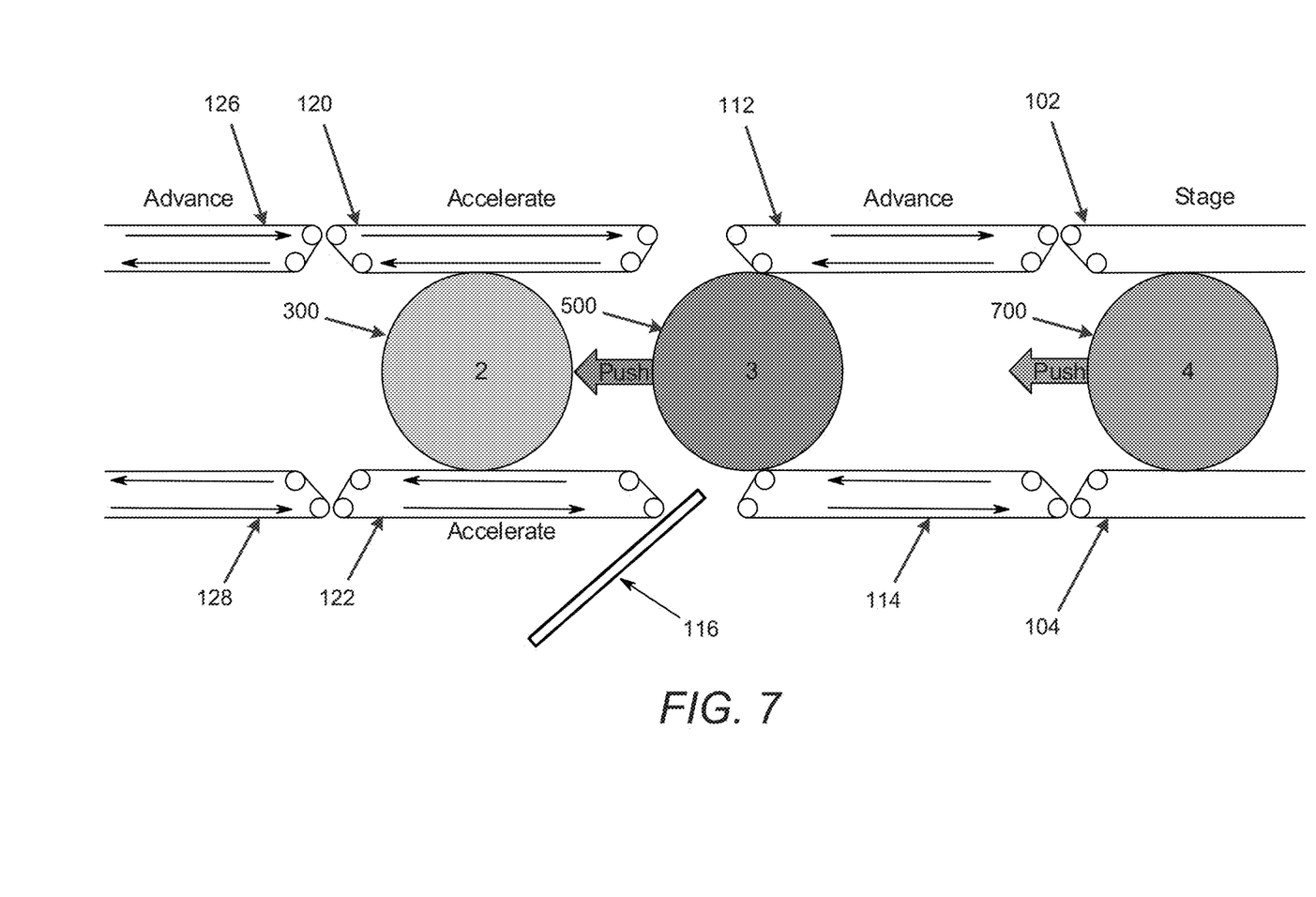
FIG. 7 illustrates another example of operation of the variable size container handling system of FIG. 1 with three containers including a new container of a fourth size, in accordance with an example of the present disclosure.

FIG. 7 illustrates another example of operation of the variable size container handling system 100 with three containers including a new container of a fourth size (also denoted "container-4"), in accordance with an example of the present disclosure.

Referring to FIGS. 1 and 7, with the conveyors 102 and 104, 112 and 114, and 120 and 122 operable independently as shown, the containers 300, 500, and 700, which may be of the same or of different sizes, may be independently grasped and/or maneuvered. For example, compared to FIG. 3 that shows the container 200 being advanced, for FIG. 7, the container 300 is shown as being accelerated (e.g., moved at an increasing rate) by the conveyors 120 and 122, the container 500 is shown as being advanced (e.g., moved at a fixed rate) by the conveyors 112 and 114, and the container 700 is shown as being staged (e.g., held in position) by the conveyors 102 and 104. During performance of these operations on the containers 300, 500, and 700, the conveyors 102 and 104, 112 and 114, and 120 and 122 may be operated independently.

Figure 8:
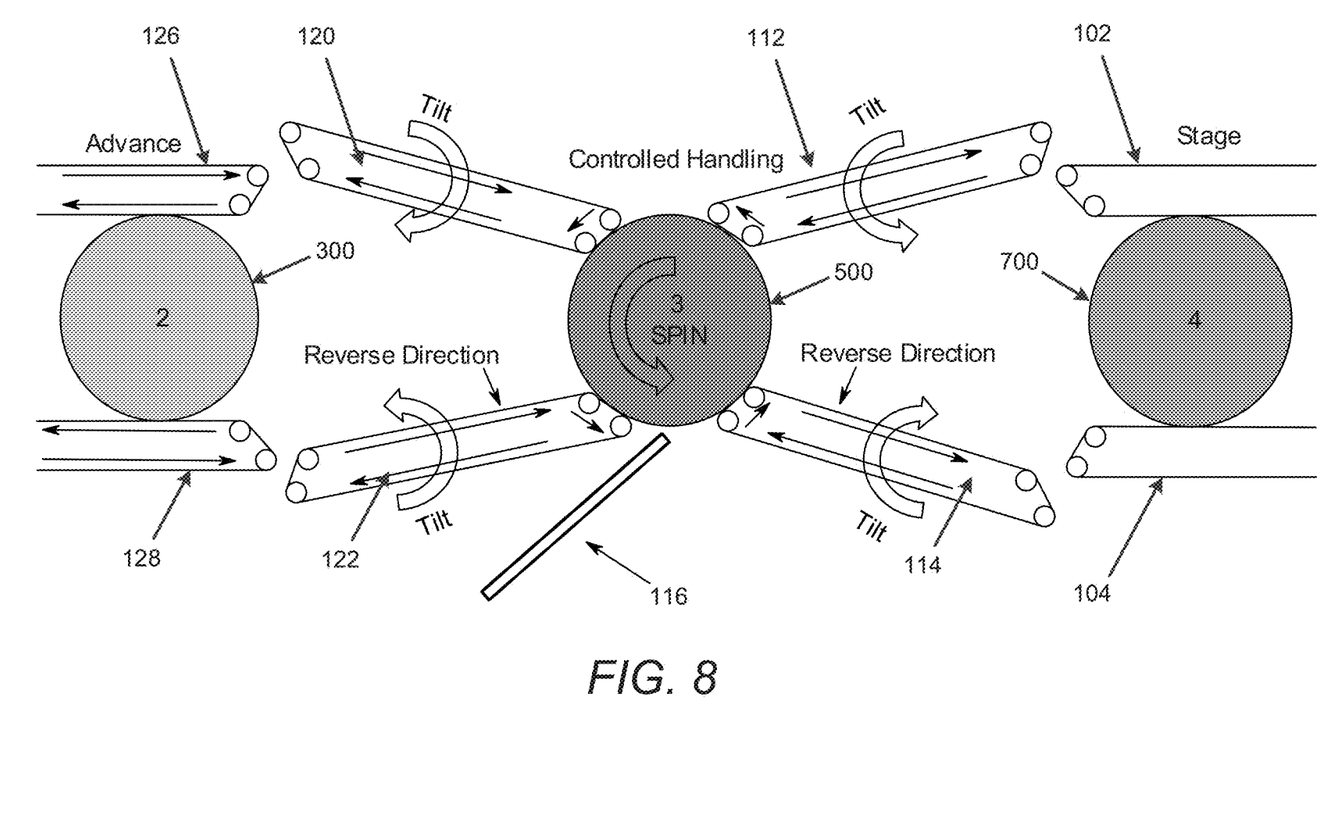
FIG. 8 illustrates another example of operation of the variable size container handling system of FIG. 1, with another one of the containers of FIG. 7 being grasped and rotated, in accordance with an example of the present disclosure.

FIG. 8 illustrates another example of operation of the variable size container handling system 100, with another one of the containers of FIG. 7 being grasped and rotated, in accordance with an example of the present disclosure.

Referring to FIG. 8, with the conveyors 102 and 104, 112 and 114, 120 and 122, and 126 and 128 operable independently as shown, the containers 300, 500, and 700, which may be of the same or of different sizes, may be independently grasped and/or maneuvered. For example, compared to FIG. 4 that shows the container 200 being grasped and rotated, for FIG. 8, the container 500 is shown as being grasped and rotated by the conveyors 112 and 114, and 120 and 122, the container 300 is shown as being advanced (e.g., moved at a fixed rate) by the conveyors 126 and 128, and the container 700 is shown as being staged (e.g., held in position) by the conveyors 102 and 104. During performance of these operations on the containers 300, 500, and 700, the conveyors 102 and 104, 112, 114, 120, and 122, and 126 and 128 may be operated independently.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A system comprising:
   at least two conveyors disposed at a specified distance apart and movable toward each other to reduce the specified distance or away from each other to increase the specified distance,
   wherein the at least two conveyors are operable to move a container that is contiguously disposable between the at least two conveyors along a first direction when the at least two conveyors are operated in the first direction and along a second direction that is opposite to the first direction when the at least two conveyors are operated in the second direction; and
   at least two further conveyors disposed at the specified distance apart and movable toward each other to reduce the specified distance or away from each other to increase the specified distance,
   wherein a further conveyor of the at least two further conveyors is rotatable in a rotary direction relative to an axis that is perpendicular to the at least two further conveyors.

2. The system according to claim 1, wherein the container includes a cylindrical container.

3. The system according to claim 1, further comprising:
   wherein the at least two further conveyors are operable to further move the container that is contiguously disposable between the at least two further conveyors along the first direction when the at least two further conveyors are operated in the first direction and along the second direction when the at least two further conveyors are operated in the second direction.

4. The system according to claim 1, wherein the rotary direction represents a first rotary direction, wherein another further conveyor of the at least two further conveyors is rotatable in a second rotary direction relative to another axis that is perpendicular to the at least two further conveyors to contiguously grasp and rotate the container, and wherein the second rotary direction is opposite to the first rotary direction.

5. The system according to claim 4, wherein the at least two further conveyors are disengageable from the at least two conveyors upon rotation of the at least two further conveyors.

6. The system according to claim 1, wherein a conveyor of the at least two conveyors is rotatable in a first rotary direction relative to another axis that is perpendicular to the at least two conveyors.

7. The system according to claim 6, wherein another conveyor of the at least two conveyors is rotatable in a second rotary direction relative to another a further axis that is perpendicular to the at least two conveyors to contiguously grasp and rotate the container, wherein the second rotary direction is opposite to the first rotary direction.

8. The system according to claim 1, wherein the at least two further conveyors represents a first set of the at least two further conveyors, and wherein the rotary direction represents a first rotary direction relative to the axis that is perpendicular to the at least two further conveyors, further comprising:
   a second set of at least two further conveyors disposed at the specified distance apart and movable toward each other to reduce the specified distance or away from each other to increase the specified distance,
   wherein the first and second sets of the at least two further conveyors are rotatable in the first and a second rotary directions relative to axes, including the axis, that are perpendicular to the first and second sets of the at least two further conveyors to contiguously grasp and rotate the container.

9. The system according to claim 8, wherein the first and second sets of the at least two further conveyors contiguously grasp the container at greater than two distinct positions.

10. A system comprising:
    at least two conveyors disposed at a specified distance apart and rotatable in first and second rotary directions relative to axes that are perpendicular to the at least two conveyors to contiguously grasp and rotate a container that is contiguously disposable between the at least two conveyors.

11. The system according to claim 10, wherein the container includes a cylindrical container.

12. A method comprising:
positioning, based on a size of a container, at least two conveyors at a specified distance apart, wherein the at least two conveyors are movable toward each other to reduce the specified distance or away from each other to increase the specified distance;
positioning, based on the size of the container, at least two further conveyors at the specified distance apart, wherein the at least two further conveyors are movable toward each other to reduce the specified distance or away from each other to increase the specified distance; and
rotating a further conveyor of the at least two further conveyors in a rotary direction relative to an axis that is perpendicular to the at least two further conveyors.

13. The method according to claim 12, further comprising:
operating the at least two conveyors to move the container that is contiguously disposable between the at least two conveyors along a first direction when the at least two conveyors are operated in the first direction and along a second direction that is opposite to the first direction when the at least two conveyors are operated in the second direction.

14. The method according to claim 12, wherein the container includes a cylindrical container.

15. The method according to claim 12, further comprising:
operating the at least two further conveyors to further move the container that is contiguously disposable between the at least two further conveyors along a first direction when the at least two further conveyors are operated in the first direction and along a second direction when the at least two further conveyors are operated in the second direction.

16. The method according to claim 12, further comprising:
positioning, based on a size of another container, the at least two further conveyors at another specified distance apart, wherein the at least two further conveyors are movable toward each other to reduce the another specified distance or away from each other to increase the another specified distance; and
operating the at least two further conveyors to further move the another container that is contiguously disposable between the at least two further conveyors along a first direction when the at least two further conveyors are operated in the first direction and along a second direction when the at least two further conveyors are operated in the second direction.

17. The method according to claim 12, wherein the rotary direction represents a first rotary direction, further comprising:
rotating another further conveyor of the at least two further conveyors in a second rotary direction relative to another axis that is perpendicular to the at least two further conveyors to contiguously grasp and rotate the container, wherein the second rotary direction is opposite to the first rotary direction.

18. The method according to claim 17, further comprising:
disengaging the at least two further conveyors from the at least two conveyors upon rotation of the at least two further conveyors.

* * * * *